Jan. 20, 1970   P. C. G. M. DE CONINCK VAN NOYEN   3,491,224
DEVICE FOR CONNECTION OF WELDING SHOE OR BLOCK HOLDERS
Filed Dec. 30, 1966                                2 Sheets-Sheet 1
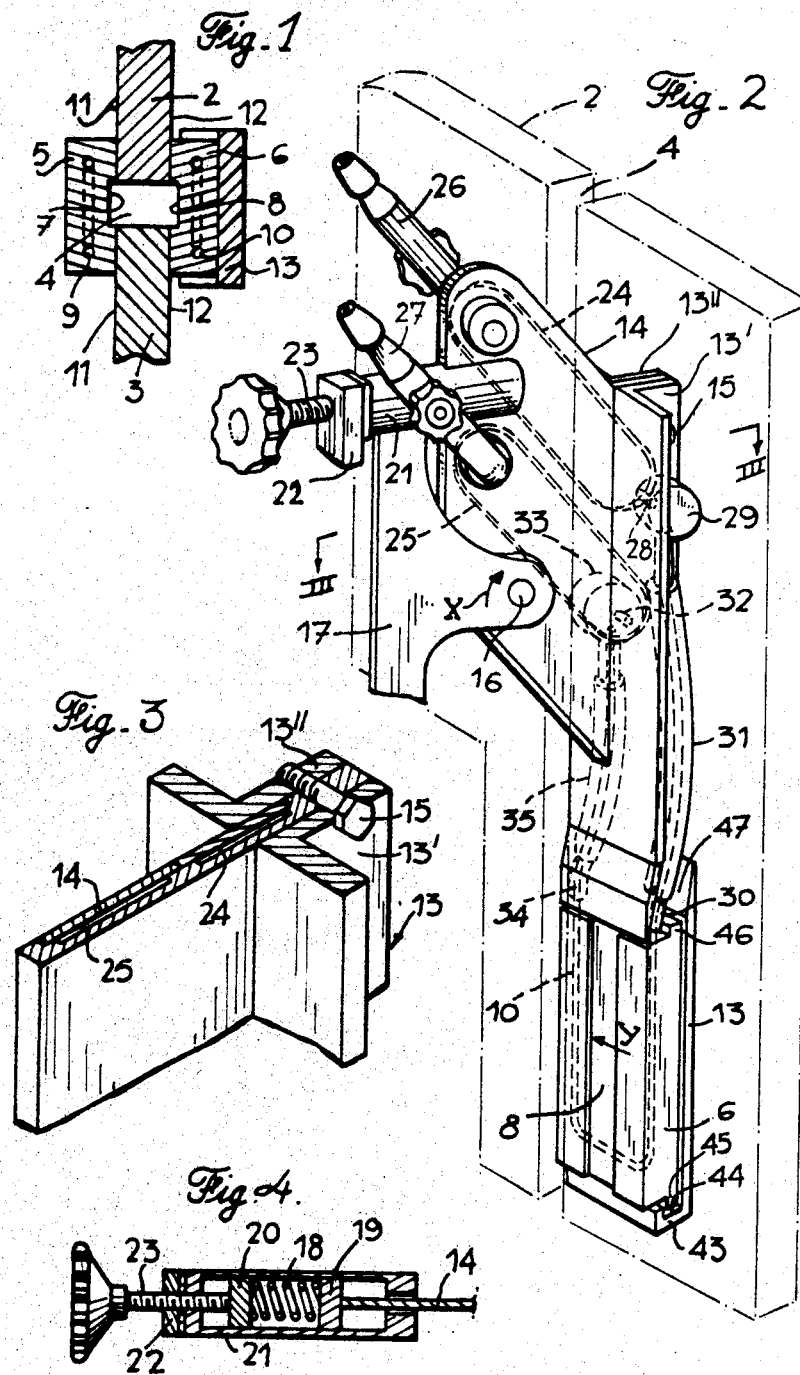

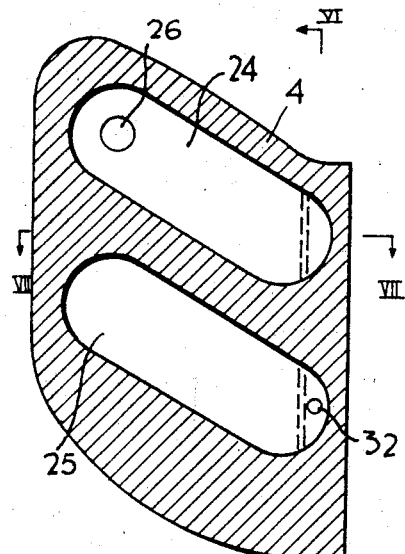
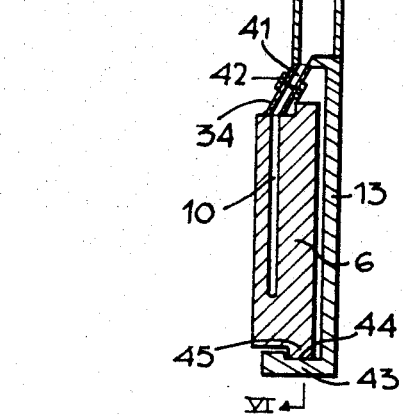
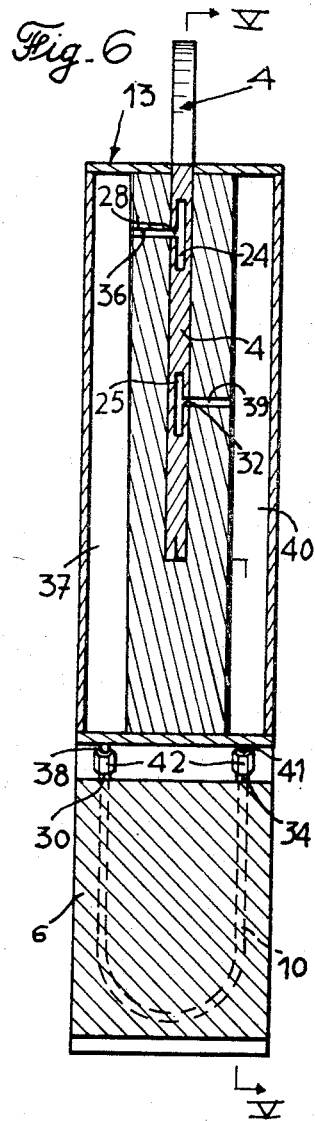
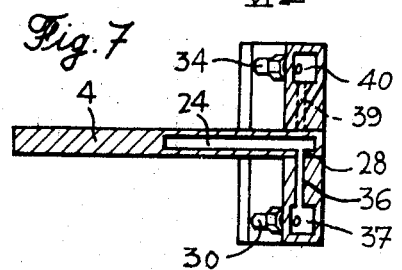

United States Patent Office 3,491,224
Patented Jan. 20, 1970

3,491,224
DEVICE FOR CONNECTION OF WELDING SHOE OR BLOCK HOLDERS
Pieter C. G. M. de Coninck van Noyen, Dilbeek, Belgium, assignor to La Soudure Electrique Autogene, Procedes Arcos, Brussels, Belgium, a corporation of Belgium
Filed Dec. 30, 1966, Ser. No. 606,433
Claims priority, application France, Jan. 14, 1966, 45,910
Int. Cl. B23k 9/12, 9/18, 25/00
U.S. Cl. 219—126                              6 Claims

ABSTRACT OF THE DISCLOSURE

A block helps dam the weld pool in vertical welding. A support arm extending thru the weld gap has interior cavities flat in the vertical direction carrying cooling fluid which thru a particular path reaches and leaves the interior of the block thru its top. The block has vertically directed top and bottom horizontal flanges. A block holder depending from the support arm has a base extending under the bottom of the block with an upwardly facing horizontal groove open at one end, in which the bottom flange rests, with related cooperation at the top of the block.

---

The present invention relates to a device for connection of shoe or block holders for damming or containing the welding bath, used in the automatic welding of vertical or almost vertical joints between upright plates.

In the technique of welding vertical or almost vertical joints by means of so-called electro-gas or electro-slag processes, two blocks for containing the welding bath are used which are provided with interior cavities in which cooling water circulates. They are applied respectively against the front surface and against the rear surface of the vertical plates at the welding place.

These blocks are connected by vertical block holders to a transverse arm passing into the space between the edges of the joint to be welded, the said transverse arm being itself connected to the equipment of which the welding machine forms a part, and moving therewith.

In the present specification, the expression "front block" indicates the block for containing the welding bath and possibly the slag bath, which is applied against the surface of the plates to be welded opposite to that where the welding head is situated which is used to deposit the welding metal from the bottom to the top between the edges of two vertical or almost vertical plates by the electro-gas or electro-slag processes. This surface of the plates is called the "front surface" and the other surface, the "rear surface." The block applied against the latter is called the "rear block" and is therefore situated on the same side as the welding head.

Up to now this connection of the front block to the source of cooling water and the return of the latter has been made by means of flexible pipes which passed into the space between the edges of the plates to be welded, or straddled this according as this space was sufficiently broad or narrow. When the space between the edges of the plates is broad enough, the feed of the cooling water to the front block and its return is made through flexible pipes which pass into this space in order to be connected to the same source of cold water as the pipes of the rear block through which the cooling water passes. The passage of the pipe into this space is not very convenient, however, and gives rise to difficulties during operation of the machine. If the said space is not wide enough to allow the passage of the pipes in question, they have to be passed above the upper edge of the plates, which causes wear of these pipes.

The present invention enables these disadvantages to be remedied.

It consists essentially in passing the cooling water of the front block from one side to the other of the plates, through the arm carrying the front block-holder, irrespective of the distance which separates the edges of the plates.

The device for connecting the front block according to the invention is characterised in that cavities are provided in the aforementioned arm which communicate, on the one hand, with the interior cavity of the front block and, on the other hand, with feed and return pipes for cooling water.

The present invention consists in arranging the transverse arm connecting the block holders, as well as the latter, so that it makes part of the circuit for supply of cooling water.

When the said arm is engaged between two flanges of the front block holder, the device according to the invention is advantageously characterised in that the connection between the cavities of the said arm and the interior cavity of the front block comprises a lateral channel with respect to one of the cavities of the arm and a lateral channel with respect to the other cavity of the arm.

Another object of the invention is to provide transverse arms the thickness of which may be as little as three millimetres. A further object of the invention is an advantageous arrangement of the front block-holder in order to keep the front block in position.

According to the invention, the front block-holder has a projecting base on which the front block rests.

In a particular embodiment, a horizontal groove is provided in the said projecting base, in which groove is engaged a projection flange at the lower end of the front block, while a flange at the upper end of the front block is engaged in another groove of the block-holder parallel to the first. In addition, the two said grooves end at at least one of the lateral faces of the front block-holder in order to permit the engagement of the block in the holder by sliding from the lateral face where the two grooves end.

The invention is also applicable to the case where the blocks are cooled by a gaseous fluid, as for example, air, $CO_2$ or any other gas. In the particular case where this fluid is a protective gas, the blocks are provided with openings at the top part of the face of the block opposite the joint to be welded, as described in the French Patent No. 1,264,844 of Aug. 9, 1960, for the purpose of drawing off a part of this gas on to the molten bath in order to protect it as in the electro-gas welding process.

Other characteristics and details of the invention will appear from the description of the attached drawings in the present specification, which show diagrammatically and by way of example, only, two embodiments of a device for connection of a front block-holder according to the invention.

FIGURE 1 is a horizontal section taken at the level of the containing blocks in a machine for automatic welding of vertical joints between vertical plates from bottom to top.

FIGURE 2 is a perspective view of the device for connection of the front block.

FIGURE 3 is a horizontal section along the line III—III of FIGURE 2.

FIGURE 4 is a longitudinal section in the device the object of which is to apply the front block against the front face of the plates.

FIGURE 5 is a vertical section along the broken line V—V of FIGURE 6.

FIGURE 6 is a vertical section along the line VI—VI of FIGURE 5.

FIGURE 7 is a horizontal section along the line VII—VII of FIGURE 5.

In these various figures, the same reference notations designate the same parts.

FIGURE 1 shows two vertical plates 2 and 3 which have betwen them a space 4 in which a band of welding must be deposited from bottom to top. The deposition is effected, for example, by the "electro-gas" process or by the "electro-slag" process. At the time of its deposition, the welding metal is held between these plates by two blocks 5 and 6, which slide along the plates as the welding advances upwards. These blocks have a groove 7 or 8 which enables a welding band a little thicker than the plates to be deposited. The blocks 5 and 6 are cooled by the circulation of water in an interior cavity. In order to simplify the drawing, this cavity has been shown diagrammatically by a channel, indicated by 9 and 10 respectively, in the blocks 5 and 6.

The welding head is assumed to be on the side of the block 5. The latter is indicated as "rear block", while the block 6 is designated a "front block." The faces 11 of the plates against which the block 5 is applied are the rear faces, while the faces 12 against which the block 6 is applied are the front faces.

The front block 6 is carried by a block-holder 13 (FIGURES 1 and 2). This block-holder is mounted on an arm 14 which passes through the joint to be welded. The block-holder 13 is fixed on this arm, for example, by means of bolts, one of which, denoted 15, is visible on FIGURES 2 and 3. These bolts are used to enable the arm 14 to be gripped between two flanges 13' and 13" of the block-holder 13. The arm 14 crosses the joint to be welded 4. This arm pivots around a pin 16 carried by a part 17 integral with the welding head (not shown). It is urged to swing in the direction of the arrow X (FIGURE 2) under the influence of a spring 18 (FIGURE 4) compressed between two pistons 19 and 20, which are mounted in a cylinder 21 fixed on a part 22 which is also integral with the welding head. The position of the piston 20 is determined by a screw 23. The piston 19 is in contact with the povoting arm 14. This position is determined by the coincidence of the block 6 with the front face 12 of the plates 2 and 3. The pressure applied by this block against the faces 12 therefore depends on the degree of compression of the spring 18 controlled by the screw 23.

Flattened cavities 24 and 25, placed one above the other, are provided in the arm 14. These cavities communicate, on the one hand, with an interior cavity of the front block 6 indicated diagrammatically by the channel 10 and, on the other hand, with pipes 26 and 27 used respectively for the supply and return of the cooling water.

The connection between the interior cavity 24 of the arm 4 and the channel 10 of the front block 6 comprises a channel 28 provided laterally with respect to this cavity. A pipe 29 is mounted facing this channel. A groove is provided for this purpose in the flange 13' of the block holder 13. The latter is connected to a pipe 30 of the front block 6 by a flexible tube 31. In a similar way, facing the channel 32 and placed laterally with respect to the cavity 25 at one end of the said cavity, is a pipe 33 positioned in a groove of the flange 13" of the block-holder. This pipe is connected to a pipe 34 which is used for the outflow of the cooling water from the front block 6 through a flexible tube 35.

In the embodiment shown in FIGURES 5 to 7, another channel 36 facing the lateral channel 28 is provided in the block-holder 13. This channel 36 communicates with a cavity 37 in the block-holder, which cavity terminates in the vicinity of the front block 6 in a pipe 38 joined detachably to the pipe 30 of the block 6. In a similar way, another channel 39 is provided in the block-holder 13 which faces the lateral channel 32. This further channel communicates with a cavity 40 in this block-holder, which also terminates in the vicinity of the front block, in a pipe 41 joined detachably to the pipe 34 of the front block. The detachable connection of the pipes 38 and 30 on the one hand, and of the pipes 41 and 34 on the other hand, is effected, for example, by means of nuts 42 screwed on the pipes 30 and 34.

The block-holder 13 has a projecting base 43 on which the front block 6 rests. A horizontal groove 44, in which is engaged a flange 45 at the lower end of the front block, is provided in the said projecting base. A flange 46 at the upper end of this block is engaged in another groove 47 of the block-holder which is parallel to the first. These two grooves 44 and 47 terminate at one of the lateral faces of the block-holder in order to allow the front block to engage in the block-holder by sliding in the direction of the arrow Y from the lateral face of this block where these two grooves terminate.

What I claim is:

1. Device for supporting the front and back blocks of an automatic vertical welding machine, which comprises two blocks intended for applying at the welding place against the front face and the rear face respectively of vertical plates to be welded, and provided respectively with inner cavities in connection with a supply of a cooling fluid which is situated at the same side of the plates as the rear block, the connections between the said supply and the said front block passing through the gap between the said plates, said device comprising a block-holder on which the said front block is mounted and which is fixed to an arm passing through the said gap between the said plates, said block-holder comprises a substantially horizontal base projection which is provided with a groove wherein is engaged a flange provided at the lower end of the front block, the latter block also being provided at its upper end with another flange engaged in a substantially horizontal groove provided in the upper end of the block-holder, the said connections comprising at least two flat chambers which pass through the said gap inside the said arm, and which are connected with the inner cavity of the said front block by way of other parts of the connections which are conduits situated entirely out of the said gap.

2. Device according to claim 1, wherein the said conduits connecting the inner cavity of the front block to the inner chambers of the said arm comprise a channel that is lateral with respect to one of the said chambers and a channel that is lateral with respect to the other chamber.

3. Device according to claim 2, wherein the said conduits connecting the inner cavity of the front block to the inner chambers of the said arm comprise flexible tubes connecting the said two lateral channels respectively to pipes for the inlet and the outlet of the cooling fluid from the front block.

4. Device according to claim 2, wherein the said conduits connecting the inner cavity of the front block to the inner chambers of the said arm comprise two ducts provided within the block-holder, connecting the said two lateral channels respectively to pipes for the inlet and the outlet of the cooling fluid from the front block.

5. In equipment which is for automatic arc welding of joints that are at least almost vertical and has a welding head:

(a) two blocks to operate respectively on opposite sides of the weld gap to form a dam for a weld pool, the one on the side away from the welding head being called hereinafter the front block, and the one on the side toward the welding head, the rear block, said front block having a cavity inside for circulation of cooling fluid which cavity has two openings in the top of the block for respective receipt and discharge of said fluid, said front block having surfaces adapted to contact the surfaces of the work to be welded and having a flange extending downward from its bottom and one extending upward from its top, each flange being located spaced from the work;

(b) a holder for the front block having a body adapted to extend from bottom to top of the block, the holder having below the block a projection which has a groove in its upper face adapted to support the downward flange of the block, which groove extends uninterruptedly parallel to the work to the end of the projection in at least one direction, and the holder having above the block a projection which has a groove in its lower face adapted to position therein the upward flange of the block, which groove extends uninterruptedly parallel to the work to the end of the projection in at least the same direction;

(c) a support for the holder adapted to extend from the welding head side of the weld gap through the weld gap and having two cavities in its interior which are flat, each extend completely through the weld gap, and each have their greatest cross-sectional dimension in a plane extending through the weld gap transversely to the work;

(d) connections for passage of cooling fluid between the respective ends of the said cavities in the support on the side away from the welding head and the respective openings in the top of the front block; and (e) connections for passage of cooling fluid between a source of cooling fluid and the respective ends of the said cavities in the support on the side toward the welding head.

6. Device according to claim 1, in which the flat chambers are located one above the other and each have their greatest cross sectional dimension in the vertical direction, and the consrtuction of flat chamber and conduit connecting it with the inner cavity of the front block is in each case such as to provide an abrupt change of the overall fluid passageway in the immediate neighborhood of the flat chamber, the block-holder has a base projecting under the bottom of the block, which base has an upwardly facing open groove running horizontally, and the bottommost part of the block is shaped to rest in the groove.

References Cited

UNITED STATES PATENTS

| | | | |
|---|---|---|---|
| 2,997,571 | 8/1961 | Smout | 219—126 |
| 3,170,430 | 2/1965 | Bistak | 219—73 |
| 3,193,660 | 7/1965 | Colinet | 219—126 |
| 3,204,082 | 8/1965 | Dudko et al. | 219—73 |
| 3,211,887 | 10/1965 | Cotterman | 219—126 |
| 3,235,705 | 2/1966 | Agnew et al. | 219—126 |
| 3,251,526 | 5/1966 | Agnew et al. | 219—126 |
| 3,281,570 | 10/1966 | Wooding | 219—126 |

JOSEPH V. TRUHE, Primary Examiner

W. DEXTER BROOKS, Assistant Examiner

U.S. Cl. X.R.

219—73